US005461660A

United States Patent [19]

Dooms et al.

[11] Patent Number: 5,461,660

[45] Date of Patent: Oct. 24, 1995

[54] MEDICAL X-RAY RECORDING SYSTEM

[75] Inventors: Philip Dooms, Edegem; Hugo Van Bouwel, Boechout, both of Belgium

[73] Assignee: AGFA-Gevaert, N.V., Mortsel, Belgium

[21] Appl. No.: 267,507

[22] Filed: Jun. 29, 1994

[30] Foreign Application Priority Data

Jul. 8, 1993 [EP] European Pat. Off. .............. 93202001

[51] Int. Cl.$^{6}$ .............................................. G03B 42/04

[52] U.S. Cl. ......................... 378/185; 378/182; 250/487.1

[58] Field of Search ..................................... 378/185, 182, 378/184, 187, 188; 250/483.1, 487.1, 488

[56] References Cited

U.S. PATENT DOCUMENTS

| | | | |
|---|---|---|---|
| 2,904,689 | 9/1959 | Masi et al. | 250/487.1 |
| 4,195,228 | 3/1980 | Rabatin | 250/483.1 |
| 4,603,259 | 7/1986 | Rabatin | 250/483.1 |
| 4,893,021 | 1/1990 | Bollen et al. | 378/183 X |

FOREIGN PATENT DOCUMENTS

| | | | |
|---|---|---|---|
| 0225400 | 12/1984 | Japan | 250/483.1 |

*Primary Examiner*—David P. Porta

*Attorney, Agent, or Firm*—Breiner & Breiner

[57] ABSTRACT

An X-ray recording system is provided characterised in that (i) a double sided X-ray film is arranged between an X-ray intensifying screen and a reflecting sheet material (ii) said reflecting sheet material has at least one reflecting side (iii) the total white light reflection of said reflecting side is at least 30%

(iv) said reflecting side of said reflecting sheet material is kept in close contact with one of the emulsion layers of said double sided X-ray film. Preferably said reflecting side shows a total white light reflection at least 50%.

10 Claims, 1 Drawing Sheet

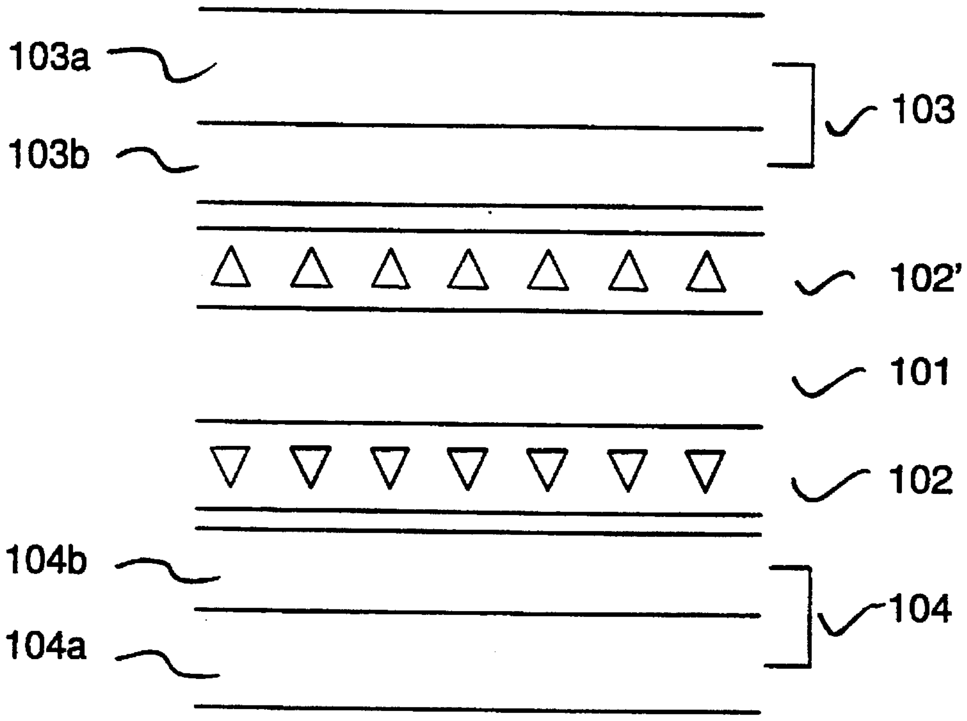
103a
103b
103
102'
101
102
104b
104a
104

MEDICAL X-RAY RECORDING SYSTEM

DESCRIPTION

1. Field of the invention.

The present invention relates to X-ray intensifying screens and the use thereof in medical applications.

2. Background of the Invention

In radiography the interior of objects is reproduced by means of penetrating radiation, which is high energy radiation belonging to the class of X-rays, λ-rays and high-energy elementary particle radiation, e.g. β-rays, electron beam or neutron radiation. For the conversion of penetrating radiation into visible light and/or ultraviolet radiation luminescent substances, called phosphors, are used.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed to form therein a silver image in conformity with the X-ray image.

For use in common medical radiography the X-ray film comprises a transparent film support double-side coated with a silver halide emulsion layer. During the X-ray irradiation said film is arranged in a cassette between two X-ray conversion screens each of them making contact with its corresponding silver halide emulsion layer.

For each diagnosis, the diagnostician needs an X-ray recording system that presents a latitude (or contrast) appropriate to the diagnosis at hand.

When diagnosing bone lesions e.g. the diagnostician is almost exclusively interested in the image of the bones and may disregard more or less the surrounding soft tissue. This means that only an image of the X-rays penetrating the bones has to be recorded. Since the absorption of X-rays by bone is only changed by differences in thickness of the bones, the X-rays reaching the recording system offer low contrast and a recording medium presenting high contrast is desirable. When diagnosing on the other hand e.g. a thorax the diagnostician not only wants to have a clear picture of the lung fields, but also wants a clear picture of the lung fields that are obscured by the heart and breast bone. The lungfields absorb far less X-rays than the breast bone or the heart, and the X-rays entering the recording system present a high contrast and a recording medium with low contrast (or high latitude) is desired to accomodate the large differences (depending on which tissue they have transversed) in X-ray intensities reaching the recording medium.

To meet the different contrast (or latitude) requirements of the diagnosticians, the major manufacturers of medical X-ray films offer an assortment of films wherein each of the films has a specified latitude.

It has been disclosed e.g. in EP 232888 to use asymmetrical (instead of symmetrical) screen pairs in combination with a symmetrical X-ray film to enhance the performance of an X-ray recording system, but this document does not have a teaching on the influence of the use of an asymmetrical screen pair on the latitude of the recording system. In the CURIX OPTHOS (CURIX and OPTHOS are trademarks of Agfa-Gevaert NV, Mortsel, Belgium) chest radiography system a asymmetrical screen pair is used in combination with a symmetrical double sided X-ray film to enhance the latitude in the low density region of a dedicated chest X-ray film. The average contrast however is not changed.

To offer more latitude, especially in chest radiography, it has been disclosed,. e.g. in EP 384633, EP 384634, EP 384753 to use an asymmetrical double sided X-ray film, having very low cross over, in combination with an asymmetric screen pair.

The disclosures mentioned above do indeed solve the problem of the diagnostician by offering a range of different latitudes, but complicate the stock keeping in a hospital, since a hospital has to keep at least two film types in stock. Using different film types in a radiological department of a hospital can give rise to mistakes when loading a cassette with film, and it is always possible that a film intended for diagnosis of e.g. a thorax is inadvertently used for a bone examination and vice-versa. This gives rise to retakes which increase the dosis of X-rays for the patient and the costs of the examination for the hospital.

Since, however, in many hospitals a particular examination is linked to a particular examination room and also the cassettes, comprising an X-ray intensifying screen combination, in which the medical X-ray film is exposed, are linked to an specific examination room, it would be beneficial to have a possibility to alter the latitude of the recording medium (screen combination+film) via the screen combination and not via the film. This would eliminate virtually all retakes due to having the wrong latitude and so save dosis for the patient and costs for the hospital.

3. Object and Summary of the Invention

It is an object of the present invention to provide means to adapt the latitude of a medical X-ray recording medium, consisting of a photographic element sandwidched between an X-ray intensifying screen combination, via the screen combination.

It is another object of this invention to provide a cassette by which it is possible to change the latitude of a normal X-ray film, comprising a transparent film support double-side coated with a silver halide emulsion layer, both silver halide emulsions having essentially the same speed and latitude.

Other objects and advantages of the present invention will become clear from the-description hereinafter.

According to the present invention an X-ray recording system is provided characterised in that (i) a double sided X-ray film is arranged between an X-ray intensifying screen and a reflecting sheet material (ii) said reflecting sheet material has at least one reflecting side (iii) the total white light reflection of said reflecting side is at least 30%.

(iv) said reflecting side of said reflecting sheet material is kept in close contact with one of the emulsion layer sides of said double sided X-ray film.

In a preferred embodiment said reflecting side of said reflecting sheet material has moreover a specular reflection ($R_{spec}$) and a total reflection ($R_{tot}$) at the wavelenght of maximum emission of the phosphor contained in said X-ray intensifying screen, such that $R_{spec}/R_{tot} \geqq 0.40$.

4. Detailed Description of the Invention

The use of (a) reflecting layer(s) in combination with an X-ray intensifying screen to provide higher latitude and more information in the final diagnostic image, has been described in EP 276497. In that document, however, single sided film on a transparent or white support or double sided film on an white support is always used to provide images with high latitude. The use of a reflecting layer in combination with an X-ray intensifying screen in medical X-ray imaging as disclosed in EP 276497, does not solve the problem of needing a special film for achieving higher latitude, and does thus not solve the problem of possible retakes and more expensive stock keeping.

In the system according to the present invention a reflecting sheet material, comprising at least one reflecting side, is used in combination with an X-ray intensifying screen. In the system a regular double sided X-ray film, comprising a transparent film support on each side coated with a silver halide emulsion layer, both silver halide emulsions having essentially the same speed and latitude, can be sandwiched between the X-ray intensifying screen and said reflecting side of said reflecting sheet material to achieve higher latitude.

The reflecting side of said reflecting sheet material reflects the light emmitted by the intensifying screen-that has passed through the X-ray film back on the emulsion with which said reflecting side is in contact.

The reflecting side of said reflecting sheet material for use according to the present invention can be made of any light reflecting material, as long as the total white light reflection of the reflecting side of said reflecting sheet material, is at least 30%, preferably at least 50% and most preferably at least 70%.

Suitable materials, for use as reflecting sheet material according to the present invention, are plastic films containing a white pigment. Said plastic films are e.g. polyester films comprising said white pigment in the bulk of said plastic film, said white-pigment being e.g. $BaSO_4$, $TiO_2$ as disclosed e.g. in U.S. Pat. No. 4,780,402.

The reflecting sheet material used according to the present invention may also have only one side or carry one reflecting layer of which the total white light reflection is in accordance with the requirements described above, as long as said reflecting layer is kept in contact with the photographic element, sandwiched between said reflecting material and an X-ray intensifying screen.

When using plastic films containing white pigments as reflecting sheet materials, according to the present invention, it is preferred to use a polyolefin voided polyester film on which at least one non voided polyester layer is laminated, said non voided layer comprising as white pigment $TiO_2$ and acting as reflecting layer. Preferably the non voided layer comprises $TiO_2$ in amounts of 10 to 25% w/w with respect to the polyester, most preferably the amount of $TiO_2$ is between 15 and 20% w/w with respect to the polyester. Such film sandwidches have been described in e.g. WO 94/004961 and EP 360201.

In another preferred embodiment of the present invention, the relecting layer is a metal layer. This may be a thin foil of metal, e.g. Al, of 10 to 200 μm thick, or may be a plastic film on which a metal layer, e.g. Al is vapour deposited. In that case the vapour deposited layer is between 100 and 1000 nm thick.

The reflecting sheet material, according to this invention may comprise a support and a coating composition comprising a binder and reflecting pigments. Examples of such reflecting sheet materials are e.g. materials comprising a paper support and on at least one side a coating solution comprising a white pigment dispersed in a binder in amounts sufficient to fulfil the requirements on total white light reflection.

In a preferred embodiment said reflecting side of said reflecting sheet material has moreover a specular reflection ($R_{spec}$) and a total reflection ($R_{tot}$) at the wavelenght of maximum emission of the phosphor contained in said X-ray intensifying screen, such that $R_{spec}/R_{tot} \geqq 0.40$.

The reflecting sheet material, according to the present invention, whatever the composition of it, can have any thickness. Preferably the reflecting sheet material, according to the present invention, has a thickness such as to fit in a regular medical X-ray cassette. The thickness of the reflecting sheet material, according to the present invention, is preferably between 50 and 500 μm, most preferably between 100 and 300 μm.

The reflecting sheet material,.according to the present invention is used in combination with an X-ray intensifying screen. It is possible to combine said reflecting sheet material with any common X-ray intensifying screen. It is also possible to use in an X-ray recording system, according to the present invention, commercially available X-ray intensifying screens.

Common X-ray conversion screens comprise in order: a support (also called substrate), a layer comprising phosphor particles dispersed in a suitable binder and a protective coating coated over the phosphor containing layer to protect said layer during use. Further, a primer layer is sometimes provided between the phosphor containing layer and the substrate to closely bond said layer thereto.

It is possible, according to the present invention to use UV/blue emitting intensifying screens as well as green emitting intensifying screens. A survey of blue light and green light emitting phosphors that are used in X-ray intensifying screens is given in EP-A 0 088 820. The X-ray intensifying screens, used in combination with the reflecting sheet material according to this invention, may also comprise mixtures of phophors as disclosed e.g. in EP-A 520 094. The screens for use with a reflecting sheet, material according to this invention, may contain pigments as described e.g. in EP-A 592 724.

For a survey of binders, supports, coating aids etc. that may be incorporated in X-ray intensifying screens reference is made to EP-A 520 094 and EP-A 592 724.

Both the reflecting sheet material, according to the present invention and an X-ray intensifying screen are positioned around a regular medical X-ray film, with the phosphor layer of said intensifying screen and the reflecting side of said reflecting sheet material each kept in close contact with one of the emulsion layers. This sandwich of medical X-ray film between intensifying screen and reflecting sheet material may be kept in close contact by any means known in the art, e.g. in an X-ray cassette, a lighttight plastic bag from which all air is evacuated or in an X-ray cassette, comprising at least one exhaust opening via which air can be evacuated from the interior of the closed and fastened cassette to enhance the contact between said intensifying screen, said double sided X-ray film and said reflecting sheet material as described e.g. in U.S. Pat. No. 4,194,625.

Preferably said intensifying screen and said reflecting sheet material are mounted in a lightthight cassette and an medical X-ray film on a transparent support is sandwidched between the intensifying screen and the reflecting sheet material. The X-ray film is brought in close contact with that side of said intensifying screen that carries the phosphor layer and with that side of said reflecting sheet material that carries a reflecting layer.

The X-ray film used in combination with the reflecting sheet material, according to the present invention, a duplitized medical X-ray film. It is preferred to use a duplitized medical X-ray film in combination with the reflecting layer according to this invention. The silver halide of the silver halide emulsion layers that are coated on a support to form the medical X-ray film may have a different grain size, spectral sensitivity and speed.

The colloid binder of the silver halide emulsion layers preferably consists essentially of gelatin.

Silver halide used in the photographic materials according to the present invention may be any type of photosensitive silver halide, e.g. silver bromide, silver chloride, silver chloroiodide, silver bromoiodide or silver chlorobromoiodide or mixtures thereof. The grain size is preferably in the range of 0.1 to 1.2 μm.

For example, silver halide emulsions are employed wherein the silver halide has a mean grain size smaller than 0.55 μm, and is a silver chlorobromide optionally containing up to 1 mole % of iodide.

A survey of the preparation and types of silver halide emulsions and their addenda used in radiographic materials is given in Research Disclosure Aug. 1979, item 18431.

Also high aspect ratio silver halide emulsions as disclosed in e.g. Research Disclosure, Volume 225, Jan 1983, item 22534 and EP-A 569 075 can be used in an X-ray recording system according to the present invention.

In an X-ray recording system according to the present invention, it is also possible to use any commercially available X-ray film, as long as the spectral sensitivity of said X-ray film is adapted to the emission wavelength of the X-ray intensifying screen.

An X-ray recording system, containing an X-ray intensifying screen, a reflecting sheet material, according to the present invention, and a medical X-ray film sandwiched between said intensifying screen and said reflecting sheet material may be exposed either with said intensifying screen facing the X-ray tube, or with said reflecting sheet material facing the X-ray tube. The position Of the reflecting sheet material, according to the present invention, with respect to the X-ray tube does not influence latitude, sharpness, noise and speed of the recording system.

5. The drawing.

The sole FIGURE of the drawing illustrates a specific embodiment of the invention. However, the invention is not intended to be limited by the specific embodiment. Thus, in the drawing 101 illustrates a support for an X-ray film, 102 and 102' each illustrates a silver halide emulsion layer, 103 illustrates an X-ray intensifying screen, **103*a* illustrates the support for intensifying screen 103, 103*b* illustrates the phosphor layer of intensifying screen 103, 104 illustrates a reflecting sheet material, 104*a* illustrates the support for reflecting sheet material 104, and 104*b* illustrates the reflecting layer of reflecting sheet material 104**.

Measurement of the Reflection Properties of the Reflecting Sheet Material

The reflection properties of the reflecting sheet material were measured in a SPECTROPHOTOMETER MODEL 555, sold by Perkin-Elmer Corporation, Instrument Division, from Norwalk CT06856 USA.

Preparation of X-Ray Intensifying Screens

Phosphor coating compositions were prepared by intimately mixing the following components:

| | |
|---|---|
| $CaWO_4$ | P g |
| BaFBr:Eu | Q g |
| cellulose acetobutyrate (30% in 2-butanone) | 13.33 g |
| polyethyl acrylate (30% in ethyl acteate) | 42.20 g |
| ethyl acetate | 9.75 g |
| methyl glycol | 19.30 g |
| 2-butanone | 9.75 g |
| dispersing agent GAFAC RM 610 (tradename) | 0.40 g |

P + Q = g

Said composition was doctor blade coated onto a subbed 200 micron thick polyethylene terephthalate support at different phosphor coverages and dried.

By roll coating onto the dried phosphor-containing layer a cellulose acetobutyrate layer having a dry thickness of 10 micron was applied as protective layer.

Composition of the Screens Used in the Examples Hereinafter

In table 1 the composition of the different screens-used in the comparative examples and examples is summarized.

TABLE 1

| | SCREEN NUMBER | | | | |
|---|---|---|---|---|---|
| | 1 | 2 | 3 | 4 | 5 |
| $CaWO_4$ in % of phosphor | 100 | 100 | 90 | 80 | 88 |
| BaFBr:Eu in % of phosphor | 0 | 0 | 10 | 20 | 12 |
| Phosphor thickness g/m$^2$ | 500 | 400/600* | 600 | 460 | 400 |

*400 g/m$^2$ front screen and 600 g/m$^2$ back screen

Reflecting Sheet Material

The reflecting sheet material used with the screens from table 1 was a 0.175 mm thick polyethyleneterephtalate film (PET) containing 17% of $BaSO_4$ in the bulk of the film. The total white light reflection was 89%, the ratio of the diffuse reflection at 390 nm (the wavelength of maximum emission of BaFBr:Eu phosphor) to the total reflection at that wavelenght was 96%. In the tables, which shows the results, this reflecting sheet material is termed SWP.

X-ray Exposure in Combination with Radiographic Film

The screens (table 1) were combined either as a screen pair (in the comparative examples) or with a reflecting sheet material according to the present invention (in the examples). The combinations screen/screen or screen/reflecting sheet material were arranged in the same type of cassette and between the combinations and in contact therewith a same duplitized (double-side silver halide emulsion coated) radiographic film was inserted.

In manufacturing the film a silver bromoiodide emulsion (2 mole % of silver iodide) was used containing silver halide grains with an average grain size of 1.25 micron. The emulsion ready for coating contained per kg an amount of silver halide corresponding to 190 g of silver nitrate and 74 g of gelatin. As stabilizing agents the silver halide emulsion contained per kg 545 mg of 5-methyl-7-hydroxy-s-triazolo [1,5-a]pyrimidine and 6.5 mg of 1-phenyl-5-mercaptotetrazole.

The above emulsion was coated on both sides of a double side subbed transparent polyethylene terephthalate support. To each of the dried silver halide emulsion layers a protective layer was applied containing 1.1 $g/m^2$ of gelatin, hardened with formaldehyde and containing perfluorocaprylic acid as antistatic agent. The hardening proceeded by adding 0.03 grams of formaldehyde per gram of gelatin. Each silver halide emulsion layer contained an amount of silver halide equivalent with 7 g of silver nitrate per $m^2$. This film was used in examples 2 to 6 and comparative examples 1 to 3.

Two commercial X-ray films were also used: CURIX RP1 and CURIX RP1L. CURIX is a tradename of Agfa-Gevaert NV, Mortsel, Belgium. The former is a film with a normal latitude, the latter is a film with higher latitude.

The X-ray exposure proceeded according to ISO/DP9236 with 77 median kVp X-rays for chest exposure.

Processing of the Exposed Material

The processing of the thus exposed silver halide emulsion material proceeded with the following developing liquid, followed by fixing and rinsing at the indicated temperature and processing time.

| Composition of the developing liquid (pH: 10.1) – (35° C., 27 s). | |
|---|---|
| Hydroquinone | 30 g/l |
| Potassium sulphite | 64 g/l |
| 1-Phenyl-3-pyrazolidinone | 1.5 g/l |
| Potassium bromide | 4 g/l |
| Glutardialdehyde | 4.7 g/l |

The pH was adjusted at 10.1 with bicarbonate/carbonate buffer.

| Composition of the fixing liquid (pH: 4.3) – (34° C., 18 s). | |
|---|---|
| Ammonium thiosulphate | 132 g/l |
| Sodium sulphite | 10.8 g/l |
| Aluminium sulphate | 5.4 g/l |

The pH was adjusted at 4.3 with acetic acid/acetate buffer. The rinsing proceeded with tap water at a temperature of 27° C. for a duration of 28 s.

Test Procedure

The signal-to-noise (SNR) ratio is defined here as the quotient of the square wave response (SWR) and of the graininess known as $\sigma_D$. Since purposely the gradient of the recording systems varied widely, the value of the gradient is left out of the calculation of SNR-ratio. The SWR values were determined at 1 line pair.

The determination of the SWR value proceeded as described in DIN 6867, 2nd draft 1988.

The determination of the photographic speed S and average gradient proceeded according to the International Standard method ISO/DP9236 (42N2063) Revised edition of Nov. 1986.

The X-ray exposure proceeded according to ISO/DP9236 with 77 median kVp X-rays for chest exposure.

EXAMPLE 1

In example 1, CURIX RP1L (CURIX is a trademark of Agfa Gevaert NV, Mortsel), a latitude film, i.e. a medical X-ray film with low contrast is sandwidched between two X-ray intensifying screens number 4. CURIX RP1 (CURIX is a trademark of Agfa Gevaert NV, Mortsel), a normal contrast film was sandwidched between two X-ray intensifying screens number 4 on the one hand and between an X-ray intensifying screen number 5 and a reflecting-sheet material described earlier. After exposure and development the sensitometry, sharpness and noise of the images was evaluated. These results are summarized in table 2. The X-ray recording systems represent a 400 system: this means that the X-ray radiation dose needed to give a net density 1.00 on the photographic element, comprised in example 1, is around 2.5 μGy, since the speed of a medical X-ray recording system (film/screen) is expressed as:

$$S = \frac{1000}{\mu Gy_{(D=1.00)}}$$

In table 2 and 3 the figures for speed are expressed in log(S/100).

TABLE 2

| Film | Front screen | Back screen | Speed | Lat[1] | SWR at 1 lp/mm in % | $\sigma_D \times 10^3$ | SNR* |
|---|---|---|---|---|---|---|---|
| CURIX** RP1L | 4 | 4 | 0.58 | 2.53 | 51 | 89 | 573 |
| CURIX** RP1 | 4 | 4 | 0.57 | 3.12 | 50 | 115 | 435 |
| CURIX** RP1 | 5 | SWP | 0.61 | 2.70 | 51 | 109 | 468 |

[1]Lat: is latitude expressed as gradient (lower figure, greater latitude)
*SNR = SWR (in %)/$\sigma_D$
**tradename of Agfa-Gevaert NV, Mortsel, Belgium It is clear that the use of a combination of a reflecting layer according to the present invention and an X-ray intensifying screen, makes it possible to control the latitude of a regular X-ray film so as to have both a normal and a latitude image, using the same film type.

EXAMPLES 2 TO 6 and COMPARATIVE EXAMPLES 1 TO 3

In comparative examples 1 to 3 an X-ray film manufactured as described earlier was sandwidched between two X-ray intensifying screens. In comparative example 1 two X-ray intensifying screens number 1 were used, in comparative example 2 two X-ray intensifying screens number 2 and in comparative example 3 two X-ray intensifying screens number 4 are used.

In examples 2 and 3 the film is sandwidched between a reflecting sheet material, as described earlier and an X-ray intensifying screen number 3. In example 4, the film is sandwidched between said reflecting sheet material and an X-ray intensifying screen number 4 and in examples 5 en 6 the film was sandwidched between said reflecting sheet material and an X-ray intensifying screen number 5.

In table 3, which shows the results, comparitive example 1 (Comp. Ex 1) and examples 2 and 3 represent a 100 system. Comparative example 2 and example 4 represent a 200 system and comparative example 3 and examples 5 and 6 represent a 400 system.

TABLE 3

| | Front screen | Back screen | Speed | Gradient | SWR at 1 lp/mm in % | $\sigma_D \times 10^3$ | SNR* |
|---|---|---|---|---|---|---|---|
| Comp. Ex 1 | 1 | 1 | 0.05 | 3.10 | 61 | 90 | 678 |
| Example 2 | 3 | SWP | 0.15 | 2.67 | 57 | 91 | 626 |
| Example 3 | SWP | 3 | 0.12 | 2.68 | 58 | 84 | 690 |
| Comp. Ex 2 | 2 | 2 | 0.35 | 3.12 | 51 | 117 | 436 |
| Example 4 | SWP | 4 | 0.35 | 2.75 | 48 | 103 | 466 |
| Comp. Ex 3 | 4 | 4 | 0.58 | 3.12 | 49 | 112 | 438 |
| Example 5 | 5 | SWP | 0.57 | 2.68 | 52 | 117 | 444 |
| Example 6 | SWP | 5 | 0.58 | 2.71 | 50 | 108 | 463 |

*SNR = SWR (in %)/$\sigma_D$

It is clear that for the same speed, the gradient of the recording system can be lowered (or in other words the latitude increased) through the use of a reflelting sheet material in combination with an X-ray intensifying screen, without a loss of sharpness (SWR is comparable) and without an increase in noise ($\sigma_D$ is comparable)

We claim:

1. An X-ray recording system characterised in that (i) a double sided X-ray film is arranged between an X-ray intensifying screen and a reflecting sheet material;

(ii) said reflecting sheet material has at least one reflecting side;

(iii) the total white light reflection of said reflecting side is at least 30%;

(iv) said reflecting side of said reflecting sheet material is kept in close contact with one of the emulsion layer sides of said double sided X-ray film.

2. An X-ray recording system according to claim 1, wherein said reflecting side of said reflecting sheet material has a total white light reflection of at least 50%.

3. An X-ray recording system according to claim 1, wherein said reflecting side of said reflecting sheet material has a specular reflection ($R_{spec}$) and a total reflection ($R_{to}$t) at the wavelenght of maximum emission of the phosphor contained in said X-ray intensifying screen, such that $R_{spec}/R_{tot} \geqq 0.40$.

4. An X-ray recording system according to claim 1, wherein said double sided X-ray film, arranged between and X-ray intensifying screen and a reflecting sheet material, is contained in a cassette.

5. An X-ray recording system according to claim 4, wherein said cassette comprises at least one exhaust opening via which air can be evacuated from the interior of the closed and fastened cassette to enhance the contact between said intensifying screen, said double sided X-ray film and said reflecting sheet material.

6. An X-ray recording system according to claim 1, wherein said reflecting sheet material comprises a polyester film comprising a white pigment in the bulk of said polyester film.

7. An X-ray recording system according to claims 1, wherein said reflecting sheet material consists of a sandwich film comprising a polyolefin voided polyester film and at least one non-voided polyester film comprising between 10 and 25% $TiO_2$ w/w with respect to the polyester laminated on said polyolefin voided polyester film, said non-voided polyester film being in contact with said photographic element.

8. An X-ray recording system according to claim 1, wherein said reflecting sheet material comprises a support and a vapour deposited metal layer.

9. An X-ray recording system according to claim 8, wherein said vapour deposited metal layer is an aluminum layer with a thickness between 100 and 1000 nm.

10. An X-ray recording system according to claim 1, wherein said reflecting sheet material comprises a support and a layer comprising a white pigment and a binder material.

* * * * *